United States Patent [19]

Gibbons et al.

[11] 3,804,249

[45] Apr. 16, 1974

[54] AIR DRUM SORTER FOR SOLID WASTE

[75] Inventors: Joseph B. Gibbons; Francesco A. Passanti, both of Schenectady, N.Y.

[73] Assignee: General Electric Company, Indianapolis, Ind.

[22] Filed: Oct. 30, 1972

[21] Appl. No.: 302,190

[52] U.S. Cl. ............... 209/473, 209/74, 209/121, 209/482
[51] Int. Cl. ............................................ B07b 3/00
[58] Field of Search ............ 209/86, 113, 293, 299, 209/295, 473, 482, 74, 121

[56] References Cited
UNITED STATES PATENTS

| | | | |
|---|---|---|---|
| 1,666,130 | 4/1928 | Frederick | 209/473 X |
| 3,661,256 | 5/1972 | Hain | 209/121 X |
| 1,537,024 | 5/1925 | Burch | 209/473 X |
| 2,653,521 | 9/1953 | Ahlfors | 209/293 X |

Primary Examiner—Richard A. Schacher
Assistant Examiner—Gene A. Church

[57] ABSTRACT

A large rotating drum with its axis inclined to the horizontal, through which flows a stream of air, sorts mixed solid waste on a municipal scale into heavy and light waste components. Residential-commercial or other solid waste admitted to the central portion of the drum is tumbled continuously by the rotating drum and its interior lifter vanes. Heavy waste gravitates toward the lower end of the drum while light waste is propelled by the air stream out of the upper end of the drum.

14 Claims, 8 Drawing Figures

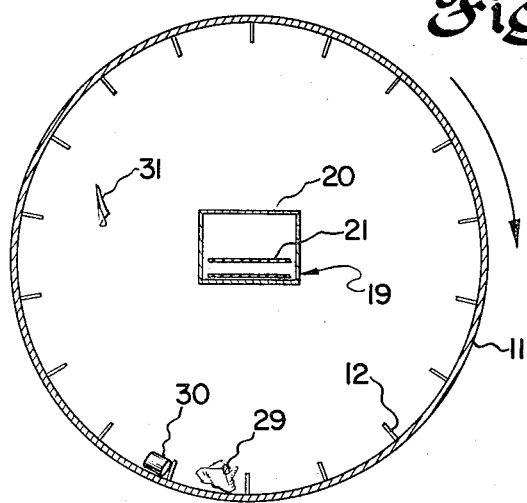
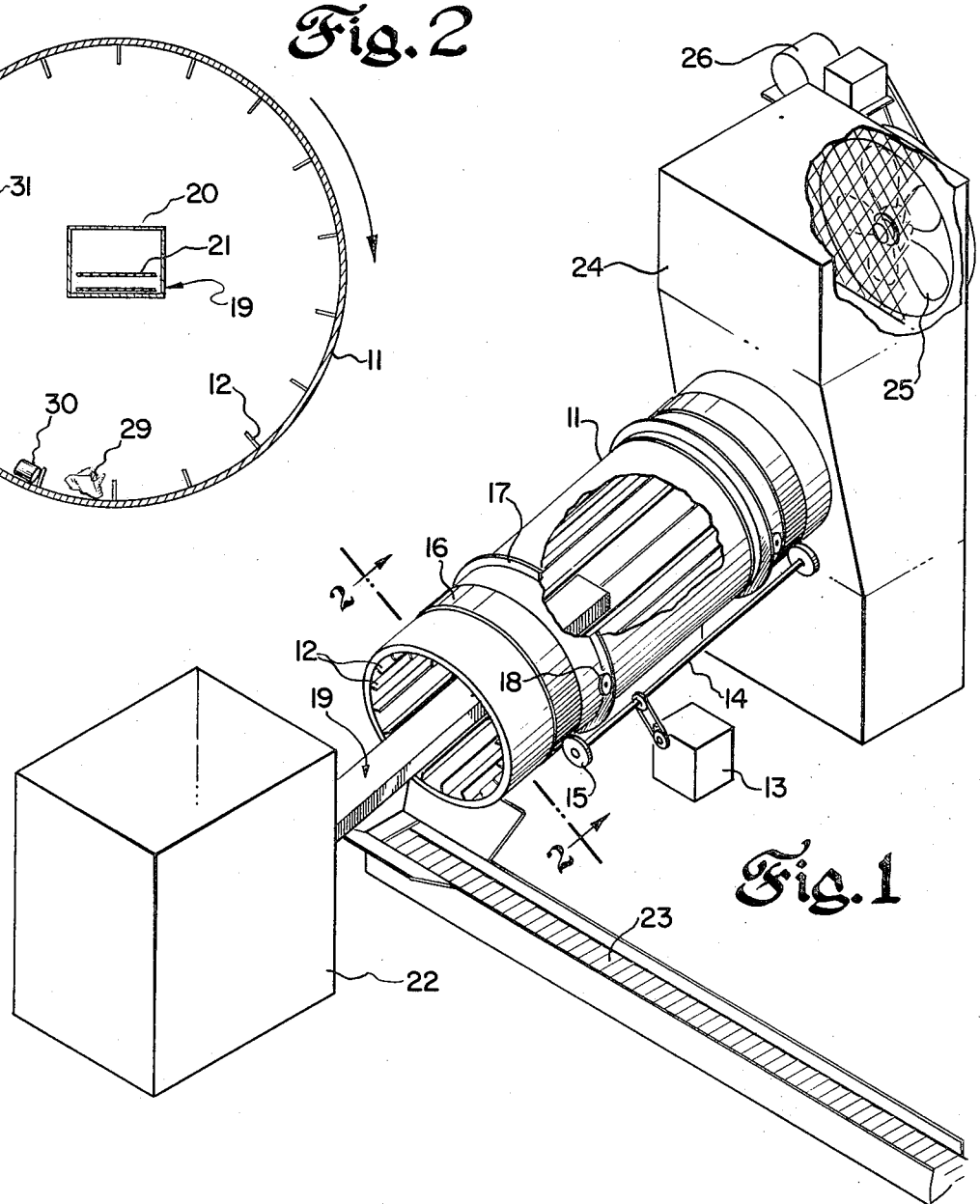
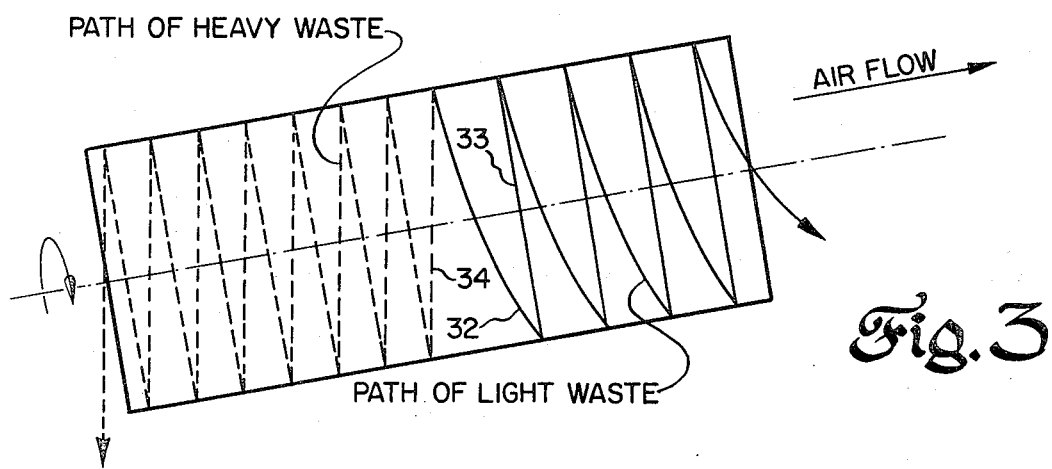

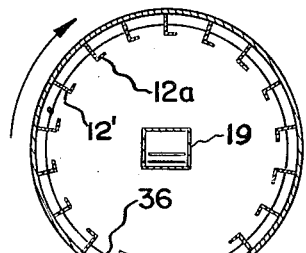
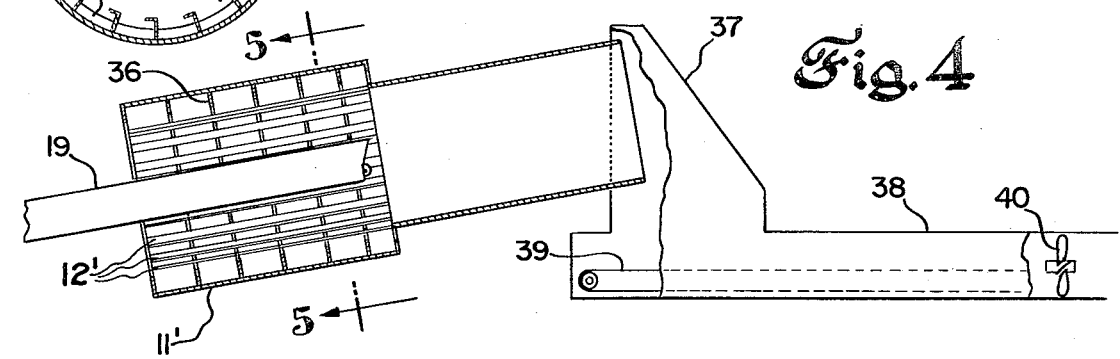
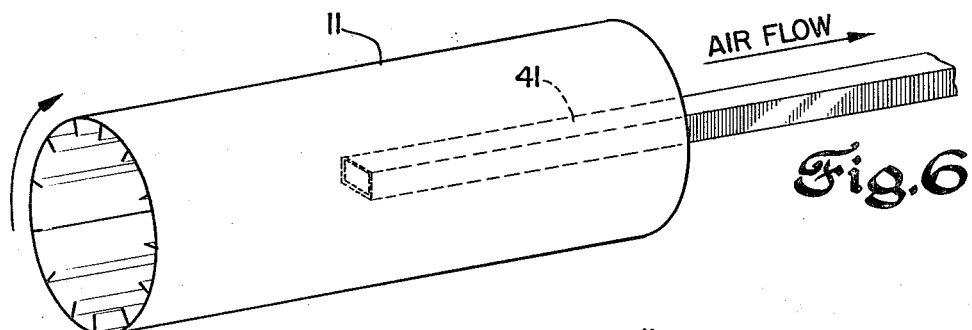
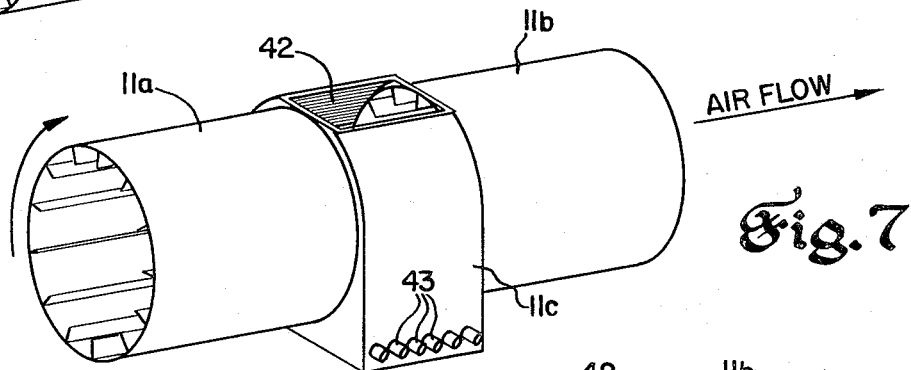
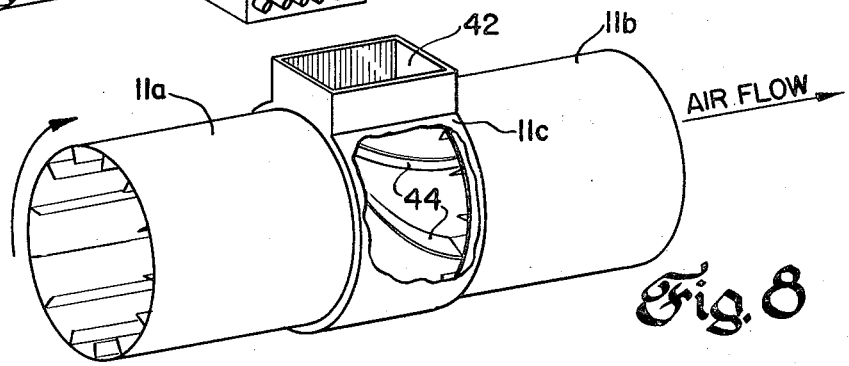

3,804,249

AIR DRUM SORTER FOR SOLID WASTE

BACKGROUND OF THE INVENTION

This invention relates to the mechanical sorting or classification of mixed solid waste, and more particularly to a rotating air drum separator suitable for the automatic sorting of residential and commercial waste and other miscellaneous waste.

The disposal of the increasing volume of solid waste, as part of the more general problem of environment, has caused rising concern in recent years. Contamination of the land by disposal of waste in landfills, of the rivers and seas by dumping waste, and of the air by burning waste, is becoming less and less acceptable. The reasons for this are the increase in the quantity of waste, the shortage of available land within reasonable distance from the cities, the concern for the environment, and the depletion of natural resources. The most acceptable solution to the problem, recognized by experts in the field and the federal authorities, is recycling and reuse of the waste. One of the major difficulties in implementing a recycling system, however, is the ability to sort the solid waste inexpensively on a bulk scale into the major material groups (metals, glass, papers, etc.) that can be accumulated and processed for reuse.

On a narrower and less urgent scale, another need for the sorting and classification of miscellaneous waste is that most equipment and processes presently in use for disposal, such as shredding and incineration, are inherently suited for some materials and not others, and can be employed more efficiently if they are applied to a homogeneous material. By proper sorting of the waste, cheaper and more efficient equipment can be used or designed. For example, shredders that will shred everything exist, but are a magnitude or more expensive than shredders for paper and light materials, which constitute about three-quarters of the waste.

SUMMARY OF THE INVENTION

In accordance with the invention, a rotating air drum sorter is used to separate mixed solid waste into heavy waste and light waste components. Although having general utility, a typical application is the separation of miscellaneous residential and commercial waste into heavy material groups such as glass, metal, wood, etc., and light material groups such as paper, cardboard, light plastics, etc. Ordinarily mixed waste is first broken down by appropriate size reduction equipment. The drum has its axis inclined to the horizontal, has dimensions of about 3-8 feet in diameter and 10-20 feet in length, and is open at both the lower and upper ends. To admit mixed waste into the central portion of the drum, an elongated conveyance structure such as an endless belt conveyor extends axially from beyond the lower end of the drum to the central portion. A fan or blower creates a stream of air longitudinally through the drum, and is preferably associated with a plenum chamber that encloses the upper end of the drum. Suitable drive means are provided to rotate the drum slowly about its axis, which desirably has a plurality of peripherally attached, inwardly directed, longitudinal lifter vanes to tumble the mixed waste continuously. Heavy waste progressively travels downward in the drum and drops out the lower end, while light waste is picked up and transported by the air stream out of the upper end of the drum.

In the preferred embodiment, the optimum angle of inclination of the drum is between 7° and 10°. Some of the available modifications are that circumferential vanes can be added to the drum interior, axially spaced to restrain sliding of heavy objects. The drum can further have a reduced diameter section to equalize the air velocity. In another embodiment, a chute type conveyance structure entering axially from the the top of the drum is used to introduce unclassified waste. A third embodiment features a pair of axially separated drum sections rotating within a fixed central section, with provision of an admittance port between the two rotating sections for directly receiving mixed waste.

BRIEF DESCRIPTION OF THE DRAWINGS

FIG. 1 is a schematic perspective view, with portions broken away, of the preferred embodiment of the rotating air drum sorter system including provision for collecting the heavy and light waste components obtained at either end of the inclined rotating drum;

FIG. 2 is a cross section of the drum to an enlarged scale taken approximately on the line 2—2 of FIG. 1, showing the conveyor for depositing mixed unclassified waste in the drum and the action of the longitudinal lifter vanes to move waste through the drum;

FIG. 3 is a side view sketch illustrating the paths of heavy and light waste components through the inclined rotating air drum;

FIG. 4 is a diagrammatic side view, partly in section, of a modification of the embodiment of FIG. 1 featuring a variable diameter air drum, the addition of circumferential vanes, and a different fan and collection arrangement at the light waste end of the drum;

FIG. 5 is a cross section of the drum taken approximately on the line 5—5 of FIG. 4 and illustrating longitudinal lifter vanes with a lip and also a circumferential vane;

FIG. 6 is a perspective diagram of a second embodiment of the rotating air drum sorter with the conveyor or chute for mixed unclassified waste entering at the top of the drum; and FIGS. 7 and 8 are similar perspective diagrams of a third embodiment of the rotating air drum sorter with provision for admitting the mixed unclassified waste at an intermediate port between upper and lower drum sections, with a stoker arrangement and a plow arrangement, respectively, for preventing pile-up of the waste below the intermediate port.

DESCRIPTION OF THE PREFERRED EMBODIMENTS

The air drum sorter system for solid waste shown in FIGS. 1-3 is a typical municipal installation for the separation of residential and commercial waste into heavy and light waste components. Assuming that there has been no prior sorting of the mixed solid waste or trash, the system is used to separate the relatively heavy objects and particles, such as glass bottles, tin cans, scraps of wood, etc., from the relatively light objects and particles made of paper, cardboard, light plastics, etc. The heart of the system, to which the invention is primarily directed, is the rotating air drum sorter 11. Air drum sorter 11 is comprised by an elongated, thin-walled, cylindrical drum open at both ends, with its axis inclined at a relatively small angle to the horizontal. The drum is rotated about its longitudinal axis, and the system has provision for creating an axial flow of air through the drum in the direction from the lower toward the upper end. As the drum rotates, the solid waste is tumbled and dropped into the air stream by means of a plurality of inwardly directed, longitudinally extending vanes 12. Light waste is propelled by the air stream upwardly through the drum and is drawn out of the upper end, while heavy waste gravitates downwardly through the drum and exits at the lower end.

Air drum sorter 11 is preferably made of steel sheet and has over-all dimensions on the order of three to eight feet in diameter and ten to twenty feet in length. To rotate the drum, an electric motor 13 or other power source rotates a drive shaft 14 and a pair of rollers 15 that run on a pair of axially spaced circular tracks 16 secured to the exterior surface of the drum. The drum also has a pair of axially spaced upstanding ribs 17 that serve as tracks for a pair of thrust wheels 18. Although not here illustrated, the entire air drum sorter 11 together with the rotating mechanism, which may take other forms from that illustrated, are mounted on a cradle or support which may have provision for adjusting the angle of inclination of the longitudinal axis of the drum with respect to the horizontal. An angle of inclination of about 7° to 10° has been found to be optimum. The longitudinal lifter vanes or baffles 12 secured to the inner periphery of the drum are preferably equally spaced and extend the full length of the drum. Vanes 12 are typically several inches in height.

The mixed unclassified solid waste is admitted or deposited in the central portion of the drum by a conveyor mechanism 19. Conveyor mechanism 19 (see also FIG. 2) is comprised by an elongated rectangular housing 20 within which is a moving belt 21 or other type of conveyor. The housing is suitably mounted to project in cantilever fashion axially through the lower end of the drum with its open end approximately midway along the length of the drum. The other end of the conveyor mechanism extends into a storage receptacle 22 for mixed unclassified waste. The raw residential and commercial waste is ordinarily run through appropriate size reduction equipment, such as a chain mill or shredder, before being dumped into the storage receptacle 22. The purpose of the size reduction treatment is to break up bagged trash, either in paper or plastic bags, and relatively large objects such as gallon glass jugs and cardboard boxes.

Below the lower end of rotating air drum sorter 11 is a collection receptacle or conveyor into which sorted heavy waste is deposited. There is illustrated a collection conveyor mechanism 23 with oppositely inclined baffles to direct heavy waste objects onto the conveyor endless belt. At the upper end of air drum sorter 11, preferably enclosing the drum opening to minimize the dust problem, is a plenum chamber 24 with provision for collecting the sorted light waste, and also provision for mounting a fan or blower to create a flow of air axially through the drum. Although these functions might be separated, they are best combined in a plenum chamber arrangement or a variation thereof. Chamber 24 is essentially a large enclosed housing with a large opening in the front wall for making air-tight engagement with the rotating upper end of the drum, as by means of a flexible rubber seal arrangement. In the back wall of chamber 24 is mounted a fan 25 which as shown is powered by an electric motor 26. Light waste objects and particles drawn out of the upper end of drum sorter 11 by the action of the air stream created by fan 25 enter the plenum chamber 24 and are collected at the bottom of the chamber. The housing can, of course, be provided with a door at the floor level to allow periodic removal of the accumulated waste, or with a conveyor for automatic removal.

The action of the longitudinal lifter vanes 12 to tumble the mixed solid waste admitted to the air drum sorter is shown diagrammatically in FIG. 2. On a continuous basis, the heavy waste objects and some light waste objects accumulate in the channels between the vanes at the bottom of the drum, for example, the crumpled paper wrapping 29 and empty tin can 30, and are lifted upwardly as the drum continues to rotate. At some point the waste object, as for example, the piece of broken glass 31, falls off of the vane and is dropped into the air stream in the drum. FIG. 3 shows typical paths of light waste objects and heavy waste objects through the drum in full and dashed lines, respectively, to achieve separation. Due to the force of the air stream, the path of free fall of light waste as shown at 32 advances the light waste upwardly in the drum. The line 33 illustrates rotation of the light waste circumferentially by the longitudinal lifter vanes until it is again dropped into the air stream. Light waste objects are moved progressively to the upper end of the drum in steps as illustrated, or if free and small enough can be immediately picked up and transported out of the upper end of the drum by the air stream. Heavy waste objects, on the other hand, have a path of free fall that is approximately vertical within the drum as illustrated at 34. Due to the angle of inclination of the drum, heavy objects travel downwardly in the drum as they are repeatedly tumbled and in this manner move progressively in steps toward the lower end of the drum. Generalizing, the direction of free fall of each piece or object inside the drum depends on the relative importance of air drag versus weight. Depending on the drag/weight ratio, the pieces travel upwardly or downwardly in the cylinder. Upon movement from the center of the cylinder toward the ends, therefore, the waste is progressively enriched in either light materials or heavy materials. Although 100 percent separation is difficult to achieve on a bulk scale, the waste exiting at the upper end of the cylinder is essentially made up of light waste, while that exiting at the lower end is essentially made up of heavy waste.

The performance of the rotating air drum sorter to achieve binary separation of mixed solid waste is influenced by the size reduction treatment, if any, given to the mixed solid waste. The previously described chain mill treatment produces relatively large object or particle sizes, and at the minimum breaks up bags of waste and extremely large objects. The tumbling action in the rotating drum further serves to disentangle and separate the various particles of different materials that make up the ordinary residential and commercial waste. The housing 20 of conveyor mechanism 19 further serves as an internal barrier onto which the mixed waste is dropped to aid in disentangling and separating the waste. Since most glass articles at best are broken into large pieces, most of the glass is classified with the heavy waste materials. By contrast, the use of an all-purpose grinder in the size reduction treatment in general produces relatively small waste particle sizes with a possibly different distribution of the different material groups. Glass articles, for example, are smashed into such small particles that they can be picked up by the air stream and go out with the paper and other light waste at the upper end of the air drum. The use of a hammer mill as the size reduction equipment produces an intermediate size of waste particles with a still different distribution of waste. It can be stated that the rotating air drum sorter is operative with large range of waste component sizes, and the degree of size reduction pretreatment depends upon the requirements at hand. In the classification of mixed residential and commercial solid waste, for instance, it is likely that there will be a second binary separation operation to classify a different set of material groups using small waste component sizes. The rotating air drum sorter system also has utility in sorting some types of demolition and industrial waste, and genreal use in appropriate cases for the separation of mixed materials into the constituent material groups.

As an example of the practice of the invention, a rotating air drum sorter system constructed in accordance with the preferred embodiment of the invention as shown in FIGS. 1–3 for the separation of mixed residential and commercial solid waste is as follows. Air drum sorter 11 has a diameter of about 5 feet, a length of 15 feet, and is rotated slowly at about 10 rpm. A total of 18 longitudinal lifter vanes 12 are provided, each several inches long. The longitudinal axis of the drum is inclined at an angle of between 7° and 10° from the horizontal, and the velocity of air through the drum is between 400 and 500 ft/min. At shallower angles of inclination, it is evident that the air flow need not be as great to pick up and transport a predetermined object weight.

FIGS. 4 and 5 illustrate several modifications of the air drum sorter system shown in FIG. 1, which uses a single continuous drum and a conveyor that enters axially from the bottom of the drum for introducing or admitting mixed unclassified solid waste into the interior central portion of the drum. Drum 11' has a variable diameter with the upper half having a reduced diameter as compared to the lower half, to equalize the velocity of air flow through the drum. To further explain this, the effective cross section of the channel for air flow in the bottom half of the drum is reduced because of the presence of the conveyor mechanism 19. By constructing the upper half of the drum with a smaller diameter, the effective cross section of the channels for air flow in both halves of the drum is the same, and hence there is no reduction of air velocity in the upper half. Another modification is that the longitudinal lifter vanes 12', FIG. 5, are provided at their free ends with right angled lip sections 12a for better retention of the waste objects as they are picked up and moved toward the top of the drum by a rotating motion. The lower half of the drum is also provided with a number of axially spaced circumferential vanes 36. These circumferential vanes are annular in shape, with a depth of several inches, and are secured at right angles to the inner periphery of the drum. Circumferential vanes 36 are particularly effective when the angle of inclination of the drum is great, and prevent heavy or large waste objects from immediately sliding all the way down to the lower end of the drum, carrying with them entangled light waste objects. Still another modification is the use, enclosing the upper end of air drum sorter 11', of a much smaller plenum chamber construction 37 with an inclined rear wall and an open bottom wall that connects to a conveyor housing 38 containing a conveyor mechanism 39 for continuously removing the collected light waste. A fan or blower 40 is mounted at a convenient location in conveyor housing 38 for creating the air flow through drum 11'. The blower can be the type that picks up light waste objects and passes them completely through the blower.

The second embodiment of the invention illustrated in FIG. 6 uses the single, constant diameter air drum sorter 11, but employs a different means for admitting mixed unclassified solid waste to the drum from that illustrated in FIG. 1. Mixed solid waste in this instance is introduced into the central portion of the drum by an enclosed conveyance structure or chute 41 that extends axially through the upper half of the drum from beyond its upper end.

Two forms of a third embodiment of the invention in which unclassified solid waste is admitted directly to the central portion of the drum are illustrated in FIGS. 7 and 8. To facilitate this arrangement, there are two identical, axially spaced, rotating drum sections 11a and 11b that are joined or bridged by a fixed central drum section 11c with a waste admitting port 42 toward its upper end. Rotating drum sections 11a and 11b are preferably rotated together at the same speed by a suitable drive system not here shown. To prevent the pileup of introduced mixed solid waste below admitting port 42, a stoker mechanism 43 is built into the bottom of central drum section 11c. Stoker 43 comprises a row of elongated rods that extend orthogonally to the longitudinal axis of the drum and are rotated in a counter-clockwise direction to move the mixed solid waste into the lower drum section 11a. In place of the stoker, the modification is made in FIG. 8 of securing one or more plow sections 44 to the upper drum section 11b to push the admitted waste in the direction of the lower drum section 11a. In this and any of the other embodiments the air can be heated to effect drying of moist and wet components of the waste.

In summary, miscellaneous residential-commercial and other mixed solid waste is separated on a municipal scale into heavy waste and light waste components by means of a rotating drum with its axis inclined to the horizontal through which flows a stream of air. The sorter system is operative with a variety of waste particle sizes obtained from different size reduction equipment, and is relatively inexpensive. Classification of solid waste into its constituent material groups by a suitable technique such as this is an essential step in the recycling and reuse of society's waste products.

While the invention has been particularly shown and described with reference to several preferred embodiments thereof, it will be understood by those skilled in the art that the foregoing and other changes in form and details may be made therein without departing from the spirit and scope of the invention.

What we claim as new and desire to secure by Letters Patent of the United States is:

1. An air drum sorter for classifying mixed solid waste into heavy waste and light waste comprising
    a drum having an axis inclined to the horizontal and open at both the lower and upper ends,
    means for admitting mixed solid waste to the longitudinally central portion of said drum, means for creating a stream of air longitudinally through said drum, and means for rotating said drum about the axis to move heavy waste toward the lower end of said drum and to cause light waste to be transported by the air stream toward the upper end of said drum.

2. An air drum sorter according to claim 1 wherein said drum includes a plurality of peripherally attached, inwardly directed vanes for tumbling the solid waste into the air stream.

3. An air drum sorter according to claim 1 wherein said means for admitting mixed solid waste is comprised by an elongated conveyance structure extending axially from beyond one end of said drum to the longitudinally central portion thereof.

4. An air drum sorter according to claim 1 further including a plenum chamber enclosing the upper end of said drum in which the light waste is collected, said means for creating a stream of air being carried by said plenum chamber.

5. An air drum sorter for classifying mixed solid waste into heavy waste and light waste comprising an elongated drum having an axis inclined to the horizontal, open at both the lower and upper ends, and having a plurality of peripherally attached, inwardly directed, longitudinally extending lifter vanes, means for admitting mixed solid waste to the longitudinally central portion of said drum, means for creating a stream of air longitudinally through said drum, and means for rotating said drum about the axis to cause said lifter vanes to tumble the mixed solid waste, thereby moving heavy waste out of the lower end of said drum and exposing light waste to the air stream to be transported out of the upper end of said drum.

6. An air drum sorter according to claim 5 wherein said means for admitting mixed waste comprises an elongated conveyor mechanism extending axially from beyond the lower end of said drum into the longitudinally central portion of said drum.

7. An air drum sorter according to claim 5 wherein said means for admitting mixed solid waste comprises an elongated chute structure extending axially from beyond the upper end of said drum into the longitudinally central portion of said drum.

8. An air drum sorter according to claim 5 wherein said drum comprises a pair of axially spaced drum sections rotating within a fixed central drum section, and said means for admitting solid waste is comprised by an admittance port formed between said rotating drum sections.

9. An air drum sorter according to claim 8 further including means located between said axially spaced rotating drum sections for moving admitted mixed solid waste to prevent pile-up beneath said admittance port.

10. An air drum sorter according to claim 5 wherein said drum further has a plurality of peripherally attached, inwardly directed, axially spaced, circumferential vanes.

11. An air drum sorter according to claim 5 wherein said longitudinally extending lifter vanes further have retaining lips at their innermost ends.

12. An air drum sorter according to claim 5 wherein said drum has a variable diameter to equalize the velocity of the air stream through said drum.

13. An air drum sorter for classifying mixed residential and commercial waste into heavy waste and light waste comprising a drum having a constant diameter, an axis inclined to the horizontal, open at both the lower and upper ends, and having a plurality of peripherally attached, inwardly directed, longitudinally extending lifter vanes, a conveyor extending axially through the lower portion of said drum for admitting mixed solid waste to the central portion of said drum, a plenum chamber enclosing the upper end of said drum, and a fan carried by said plenum chamber for creating a stream of air longitudinally through said drum, and means for rotating said drum about the axis to cause said lifter vanes to tumble the mixed waste, thereby moving heavy waste out of the lower end of said drum and dropping light waste into the air stream to be transported out of the upper end of said drum into said plenum chamber.

14. An air drum sorter according to claim 13 wherein the angle of inclination of the axis of said drum to the horizontal is between 7° and 10°.

* * * * *